United States Patent Office 3,829,389
Patented Aug. 13, 1974

3,829,389
PROCESS FOR PREPARING CALCIUM NITRATE AND PHOSPHORIC ACID SOLUTIONS FREE FROM SOLID PARTICLES IN SUSPENSION
Giacinto Veronica and Antonio Fidani, Novara, Italy, assignors to Montecatini Edison S.p.A., Milan, Italy
No Drawing. Filed July 12, 1972, Ser. No. 271,132
Claims priority, application Italy, Mar. 6, 1972, 21,460/72
Int. Cl. C01b 25/16; C01f 1/00
U.S. Cl. 252—182
12 Claims

ABSTRACT OF THE DISCLOSURE

A process is disclosed for preparing solutions consisting mainly of calcium nitrate and phosphoric acid substantially free from solid particles in suspension. The process involves attacking phosphate rock with nitric acid to obtain a slurry which contains mainly calcium nitrate and phosphoric acid and in which the silica derived from the dissolution of silicates is present in a quantity of 12 to 27 grams per kg. of attacked phosphate rock; treating the slurry with a flocculating agent of a known type in a quantity of 10–150 mg. per kg. of phosphate rock, thus forming an upper layer consisting essentially of the thickened solids and a lower layer consisting essentially of the solution subtsantially free from solid particles in suspension; and then separating the clarified solution from the thickened solids.

---

The present invention relates to the nitric acid attack of phosphate rock. More particularly, the present invention relates to a process which, by attacking the phosphate rock with nitric acid, yields solutions consisting principally of calcium nitrate and phosphoric acid, and substantially free from solid particles in suspension.

It is well known that the solubilization of phosphate rock by means of nitric acid yields slurries whose dispersing phase consists of a solution containing principally calcium nitrate and phosphoric acid together with other minor components, such as free nitric acid, fluorides or fluosilicates, nitrates of Al, Fe, Mg, Na, etc., and of a dispersed phase made up principally of silica, clays, calcium sulphate, fluorides, fluosilicates and aluminofluosilicates. Generally, the content of fine particles capable of forming a stable suspension, when the nitric acid attack has ended, is between 1 and 3% by weight.

It is also well known that the slurries resulting from the nitric acid attack, owing to the high values of viscostiy and density of the dispersing phase and to the fineness of the dispersed phase, do not cause any spontaneous or induced sedimentation within industrial acceptable times. Moreover, the filtration of the resulting slurry as such is not possible, for technical reasons depending on the very high liquid/solid ratio and on the above-said physical characteristics of each phase.

The foregoing represents a distinct disadvantage in comparison to the processes based on the sulphuric attack of the phosphate rock, i.e., processes in which the solid impurities are substantially and easily removed together with the calcium sulphate, when the latter is separated by filtration.

The preparation of calcium nitrate and phosphoric acid solutions containing solid particles in suspension gives rise to considerable difficulties—particularly in those processes that aim at producing valuable single phosphoric products such as, for instance, monocalcium phosphate, monoammonium phosphate, diammonium phosphate, and phosphoric acid, separately from the ammonium nitrate. To obtain the aforesaid valuable products, rather complex processes are adopted, which are based, for instance, on operations such as fractional crystallization, ion exchange, solvent extraction, etc.

It is self-evident that processes based on the application of the aforesaid methods require the operations to be carried out on limpid solutions or, in any case, solutions that are mostly free from solid matters which remain in suspension at the conclusion of the attack upon the phosphate rock with nitric acid. Moreover, as far as concerns fluorine recovery in the nitric acid processes, it is evidently impossible to obtain a commercially valuable fluorinated salt from a slurry containing several different solid matters.

With a view to clarifying the turbid solutions obtained by attacking the phosphate rock with nitric acid, it has been suggested heretofore to supplement the action of the flocculating agents by adding some soluble silicates to the turbid solution; still, by operating in this way, it is not always possible to obtain satisfactory results and sometimes, conversely, no useful result at all can be achieved. In any case, however, the results obtained are not reproduceable.

An object of the present invention consists in providing a process, suitable to any type of phosphate rock, which enables one to clarify the slurries resulting from the nitric acid attack on the phosphate rock, thereby obtaining a considerable thickening of the suspended solid particles.

Another object of this invention is that of providing a process which, by attacking the phosphate rock with nitric acid, allows one to obtain solutions mainly consisting of calcium nitrate and phosphoric acid substantially free from solid matters in suspension and, therefore, particularly fit for use as intermediates in several industrial processes which, in the steps following the nitric acid attack on the phosphate rock, require clarified solutions.

A further object of the present invention is that of making it economically possible to recover certain commercially valuable elements, such as fluorine, from the solutions obtained by attacking a phosphate rock with nitric acid.

These and still further objects can be achieved by means of the present invention which relates to a process for preparing solutions mainly consisting of calcium nitrate and phosphoric acid substantially free from solid particles in suspension, characterized in that:

by attacking the phosphate rock with nitric acid a slurry is prepared which mainly contains calcium nitrate and phosphoric acid and in which the silica resulting from the dissolution of silicates is present in a quantity of 12–27 grams per kg. of attacked phosphate rock; the slurry is treated with a flocculating agent of known type in a quantity of 10–150 mg. per kg. of phosphate rock, thus obtaining an upper layer constituted by the thickened solids and a lower layer constituted by the solution substantially free from solid particles in suspension; and the clarified solution is separated from the thickened solids.

In accordance with the present invention, it has now surprisingly been found that flocculating agents of known type can be successfully employed to bring about the flocculation of the solid particles suspended in a slurry from nitric acid attack of the phosphate rock, only if the attack is carried out in such way as to have, at the end of the nitric acid attack, a slurry containing $SiO_2$ derived from the silicates dissolution in an amount corresponding to 12–27 grams per kg. of attacked phosphate rock.

When operating under such conditions, the addition of the flocculating agent causes a spontaneous rising motion of the solid particles suspended in the turbid solution, thus bring about the formation of an upper thickened layer (which makes up a volume smaller than 35% of the initial volume of the slurry) and of a lower clarified layer (which makes up more than 65% of the initial volume of the slurry).

In other words, conditions have been discovered which enable one to obtain a thickened product percentage (defined as percentage ratio between the thickened layer volume and the slurry initial volume) lower than 35%, irrespective of the composition of the starting phosphate rock. This obtainment of a thickened product percentage lower than 35%, whatever the starting phosphate rock composition may be, represents a very satisfactory result from an operational viewpoint. Anyway it is clear that the smaller the thickened product percentage is, the less expensive will be the subsequent separation of the limpid solution from the solid thickened product.

According to the present invention, it has now been found that by operating with an $SiO_2$ content, derived from the dissolution of silicates, in the range of from 12 to 27 grams per kg. of phosphate rock, it is possible to obtain thickened product percentages even below 20%; this particularly advantageous result can be generally achieved by operating with an $SiO_2$ content, derived from the dissolution of silicates, between 17 and 21 grams per kg. of phosphate rock. In fact, it has been discovered that the thickened product percentage obtained in consequence of the addition of flocculating agent decreases as the total $SiO_2$ content, derived from the silicates dissolution and present in the slurry, decreases. Such decreasing trend goes on until it reaches a minimum value which corresponds to an $SiO_2$ content between 17 and 21 grams per kg. of phosphate rock. Beyond such minimum, the thickened product percentage rises as the $SiO_2$ content increases.

The process according to this invention can be carried out either continuously or discontinuously.

It should be borne in mind that the term "phosphate rock," whenever used in this description, in the examples and in the subsequent claims, means the ore with all its impurities.

If the starting phosphate rock has a content of silica in the form of silicates lower than 12 grams per kg. of of phosphate rock and, successively, by subjecting the treating the phosphate rock with a soluble silicate in such a quantity as to bring the total silica in the form of silicates to a value ranging from 12 to 27 grams per kg. of phosphate rock and, successively, by subjecting the phosphate rock to the attack with nitric acid.

A preferred way of introducing the silicate is that of spraying it onto the phosphate rock granules before they reach the reactor in which the nitric acid attack takes place.

Equally satisfactory results are attained by adding the soluble silicate to the phosphate rock during the attack with nitric acid, or by adding the soluble silicate to the slurry at the end of the nitric acid attack.

Although any soluble silicate is suitable for the purpose, still, for economic reasons it is preferable to employ a sodium silicate having an $Na_2O:SiO_2$ ratio between 1:1 ($SiO_2 \cdot Na_2O$ metasilicate) and 3:1 ($3SiO_2 \cdot Na_2O$ trisilicate).

Another method of preparing the turbid solution consists in attacking with nitric acid a mixture of two or more phosphate rocks containing different amounts of $SiO_2$ combined in the form of silicates. Said mixture shall be prepared in such proportions as to obtain in the mixture a total content of $SiO_2$ combined in the form of silicates between 12 and 27 grams per kg. of phosphate rock. Such a method is generally followed when among the various types of phosphate rock available there is some type having a content of $SiO_2$ in the form of silicates higher than 27 grams per kg. of phosphate rock, or when one desires, for any reason, to avoid adding the soluble silicate.

Of course it is possible to prepare a slurry having the desired $SiO_2$ content derived from the soluble silicates according to a method that includes both the mixing of different types of phosphate rock and the addition of a soluble silicate.

The process of the present invention usually permits one to obtain particularly advantageous results, namely thickened product percentages lower than 20%, when a slurry is prepared—no matter how—which contains amounts of silica in the form of silicates between 17 and 21 grams per kg. of phosphate rock.

When practicing the process according to the present invention, the reactant ratio between the phosphate rock and the nitric acid is the one usually employed in the known processes based on nitric acid attack, i.e. a ratio between 1.0 and 1.3 of the stoichiometric one, where stoichiometric quantity means the theoretical quantity of nitric acid required to transfer the whole calcium (calculated as CaO) present in the phosphate rock into calcium nitrate. The temperature of nitric acid attack is that usually employed in similar processes, i.e. 40–80° C.; the same may be said as regards both the concentration of the nitric acid used, namely 50–60%, and the reaction time, namely 0.5–4 hours. Conversely, as far as concerns the phosphate rock particle size, a particularly advantageous condition for practicing the method of the present invention is that of having a low percentage (not over 20%) of particles smaller than 0.06 mm. Higher percentages result in less than thoroughly limpid clarified solutions.

The flocculating agent to be added to the slurry is per se well known and is selected for instance from those made up of long-chain polymerization products containing amidic and carboxylic functions, such as for instance: Separan (manufactured by Dow Chemical), Sedipur (manufactured by BASF), Super-floc (manufactured by Cyanamid). These compounds are polyacrylamides having a molecular weight of about 1 to $2.10^6$ and containing 14–16% of nitrogen and 12–13% of saponifiable nitrogen.

The quantity of flocculating agent to be used varies according to the attack conditions (phosphate rock fineness, excess and concentration of the $HNO_3$ employed, temperature, etc); and is generally between 10 and 150 mg. per kg. of phosphate rock, and preferably between 50 and 110 mg. per kg. of phosphate rock.

The addition of the flocculating agent causes the coagulation of the solid particles in suspension, whose flocculent aggregates adsorb the gas (mainly $CO_2$) dispersed in the attack slurry and spontaneously begin to rise at a velocity of 0.3–0.6 m./h. In this way the initially homogeneous slurry separates into a lower limpid layer and an upper muddy layer. The clarified solution can be separated from the muddy thickened product for instance by siphoning the clarified liquid and by filtering the mud. The limpid solution consisting of both the siphoned liquid and the filtrate passes to the successive process steps, while the mud is purged from the cycle.

The calcium nitrate and phosphoric acid solutions, substantially free from solid particles in suspension, prepared according to the process of this invention are particularly suitable for subsequent process steps aimed at obtaining valuable single phosphoric compounds, such as, for instance, monocalcium phosphate, monoammonium phosphate, diammonium phosphate, phosphoric acid, etc. Moreover, the solutions prepared according to the process of the present invention are especially adapted to subsequent treatments capable of recovering certain elements (for example fluorine) contained in the solution as impurities. Moreover, the possibility of removing most of the fluorine from the nitric acid attack solution represents an additional advantage over and above the main one, which consists in the substantial absence of solid impurities, in view of the further treatments of the solution. It is known in fact that the fluorine in solution adversely affects the reactions based, for example, on crystallizations, neutralizations, evaporations, extractions, etc., for chemical reasons and/or danger of corrosion.

The following detailed working examples are given to better illustrate advantages, characteristics and possible

EXAMPLE 1

Here a phosphate rock is employed which has a particle size between 0.1 and 1 mm. (with 0.4% of the particles smaller than 0.6 mm.), and the following composition: CaO=48.7%; $P_2O_5$=33.5%; $SO_4$=1.4%; F=4.15%; total $SiO_2$=2.94%; $SiO_2$ in the form of silicates=0.94% (i.e., 9.4 g. per kg.); $Fe_2O_3$=1.13%; $Al_2O_3$=1.42%; $CO_2$=1.52%; MgO=0.29%; $Na_2O$=0.63%; $K_2O$=0.073%.

1,000 g. of this phosphate rock are attacked for two hours at 60° C., with 2,150 g. of 55% $HNO_3$ (corresponding to 110% of the stoichiometric ratio with respect to CaO).

At the end of the nitric acid attack, 3,100 g. of a slurry containing 1.6% by weight of fine solid matters in suspension are obtained. This constitutes a stable suspension in the sense that there is no decantation of the solid particles, not even after a long rest period (for instance 12 hours) and in the presence of flocculating agents.

EXAMPLE 2

The same ore as in Example 1 is here employed and it is attacked under the same conditions, except for the added step of treating the phosphate rock with 33 g. of sodium silicate at 40° Bé ($Na_2O$=8.4%; $SiO_2$=26.2%).

The slurry obtained at the end of the nitric acid attack contains a total content of silica, derived from the dissolution of silicates, which is equal to 18.05 grams per kg. of attacked phosphate rock (9.40 g. of which is derived from the ore and 8.65 g. from the added sodium silicate).

75 mg. of Sedipur TF (polyacrylamide produced by BASF) in the form of an aqueous solution at 0.1% by weight are added to and admixed with the turbid solution. The dispersed solid matters gather in flocs and migrate towards the container top at an average velocity of about 0.5 m./h.

The lower clarified solution makes up 83% of the total volume, while the upper thickened product makes up 17% of the total volume (this means that the thickened product percentage is 17%).

The upper layer, which has the appearance of a thick foam, contains practically all the solid impurities and has a solids content of 9.2% by weight (as dry solid with respect to the total weight of thickened slurry).

It follows therefore that it has been enriched by a factor of about 6 in comparison with the uniform starting concentration.

The solution thus obtained consists essentially of calcium nitrate and phosphoric acid and is practically limpid (0.06% of solid impurities in suspension).

EXAMPLE 3

Here a phosphate rock is employed which has the same particle size as that employed in the preceding examples and the following composition: CaO=49.8%; $P_2O_5$=33.25%; $SO_4$=1.23%; F=4.00%; total $SiO_2$=3.95%; $SiO_2$ in the form of silicates=2.50% (namely, 25 grams per kg.); $Fe_2O_3$=0.73%; $Al_2O_3$=1.18%; MgO=0.60%; $Na_2O$=0.60%; $K_2O$=0.09%.

1,000 g. of this phosphate rock are attacked with 55% $HNO_3$ under the same conditions as set forth in the previous examples.

At the end of the nitric acid attack, 100 mg. of Sedipur TF in the form of an aqueous solution at 0.1% by weight are added to and admixed with the thus obtained solution.

The dispersed solid matters gather in flocs and migrate towards the container top, analogously with Example 2.

The clarified solution below constitutes 67% of the total volume, the thickened product percentage being 33%.

EXAMPLE 4

Under the same conditions as in the preceding examples, a mixture containing 550 g. of the phosphate rock of Example 3 and 450 g. of the phosphate rock of Example 1 (said mixture containing 18.03 g. of $SiO_2$ as silicates) is subjected to the nitric acid attack and then treated with the same flocculating agent. At the end, the clarified solution constitutes 82% of the total volume, the thickened product percentage thus being 18%.

EXAMPLE 5

Here a phosphate rock is employed which has a particle size lower than 0.7 mm. (15% smaller than 0.06 mm.) and the following composition: CaO=49.2%; $P_2O_5$=33.2%; F=4.1%; $Fe_2O_3$=0.2%; $Al_2O_3$=0.6%; total $SiO_2$=2.13%; $SiO_2$ as silicates=0.85% (namely, 8.5 g. per kg.); MgO=0.26%; ($Na_2O$+$K_2O$)=1.3%; $SO_3$=1.4%; $CO_2$=4.1%.

1,000 g. of this phosphate rock are attacked, while stirring at 50° C., with 2,280 g. of 58% $HNO_3$, and with the addition of 26 g. of sodium silicate (8.4% of $Na_2O$; 26.2% of $SiO_2$), i.e., with the addition of 6.8 g. of $SiO_2$ in the form of silicate. Consequently the total silica content is 8.5+6.8=15.3 g. per kg. of phosphate rock.

After a 1-hour attack with nitric acid the slurry, which contains 2.7% of fine solid matters in suspension, is treated with 25 mg. of Sedipur TF in the form of an aqueous solution at 0.1% by weight.

The flocculated fine particles spontaneously migrate upwardly at an average velocity of approx. 0.33 m./h. and gather in a layer which constitutes 28% of the initial volume of the whole slurry. The upper layer, containing 7.2% of solid matters (dry weight), is separated from the lower layer, which contains 0.15% of solids. The upper layer is then filtered. Upon admixing the filtrate with the clarified lower layer, a solution is obtained which contains about 0.2% of solids in suspension.

What is claimed is:

1. A process for preparing solutions consisting mainly of calcium nitrate and phosphoric acid substantially free from solid particles in suspension, comprising attacking phosphate rock with nitric acid, at 40–80° C. and under atmospheric pressure, to obtain a slurry which contains mainly calcium nitrate and phosphoric acid and in which the silica derived from the dissolution of silicates is present in a quantity of 12 to 27 grams per kg. of attacked phosphate rock; treating the slurry with a flocculating agent in a quantity of 10–150 mg. per kg. of phosphate rock, thus bringing about the formation of an upper layer consisting essentially of the thickened solids and of a lower layer consisting essentially of the solution substantially free from solid particles in suspension; and separating the clarified solution from the thickened solids.

2. A process according to claim 1, wherein the slurry is prepared by subjecting to the attack with nitric acid a mixture of two or more phosphate rocks having different contents of silica combined in the form of silicates, such mixture being prepared in such proportions as to obtain a content of silica combined in the form of silicates ranging from 12 to 27 grams per kg. of phosphate rock.

3. A process according to claim 1, wherein the slurry is prepared by mixing the phosphate rock with a soluble silicate in such quantity as to bring the total amount of the silica in the form of silicate to a value between 12 and 27 grams per kg. of phosphate rock and thereafter subjecting the phosphate rock to the nitric acid attack.

4. A process according to claim 1, wherein the slurry is prepared by subjecting the phosphate rock to the nitric attack and by contemporaneously admixing therewith a soluble silicate in such quantity that the total amount of the silica in the form of silicate is brought to a value ranging from 12 to 27 grams per kg. of phosphate rock.

5. A process according to claim 1, wherein the slurry is prepared by subjecting the phosphate rock to the attack with nitric acid and, subsequently, by adding thereto a soluble silicate in such quantity as to bring the total amount of silica in the form of silicate to a value between 12 and 27 grams per kg. of phosphate rock.

6. A process according to claim 3, wherein the added soluble silicate is a sodium silicate having an $SiO_2/Na_2O$ ratio between 1:1 and 3:1.

7. A process according to claim 4, wherein the added soluble silicate is a sodium silicate having an $SiO_2/Na_2O$ ratio between 1:1 and 3:1.

8. A process according to claim 5, wherein the added soluble silicate is a sodium silicate having an $SiO_2/Na_2O$ ratio between 1:1 and 3:1.

9. A process according to claim 1, wherein the phosphate rock granulometric distribution is such that the percentage of particles smaller than 0.06 mm. is lower than 20%.

10. A process according to claim 1, wherein the flocculating agent is selected from the class consisting of long-chain polymerization products containing amidic functions and long-chain polymerization products containing carboxylic functions.

11. A process according to claim 1, wherein upon attacking the phosphate rock with the nitric acid, a turbid solution is obtained in which the silica obtained from the dissolution of soluble silicates is present in a quantity of 17-21 grams per kg. of attacked phosphate rock.

12. A process according to claim 1, wherein the flocculating agent is admixed with the slurry obtained by attacking the phosphate rock with nitric acid in a quantity ranging from 50-110 mg. per kg. of phosphate rock.

References Cited

UNITED STATES PATENTS

| | | | |
|---|---|---|---|
| 3,205,062 | 9/1965 | Gattiker et al. | 423—319 |
| 2,968,528 | 1/1961 | Tuttle et al. | 423—321 |
| 2,929,777 | 3/1960 | Clevenger | 423—321 |

FOREIGN PATENTS

| | | | |
|---|---|---|---|
| 1,113,922 | 5/1968 | Great Britain | 423—321 |
| 637,832 | 3/1962 | Canada | 423—321 |
| 1,020,015 | 2/1966 | Great Britain | 423—321 |
| 282,519 | 4/1965 | Australia | 423—320 |

OSCAR R. VERTIZ, Primary Examiner

G. A. HELLER, Assistant Examiner

U.S. Cl. X.R.

423—167, 319